United States Patent [19]
Dokic

[11] Patent Number: 5,959,659
[45] Date of Patent: Sep. 28, 1999

[54] MPEG-2 TRANSPORT STREAM DECODER HAVING DECOUPLED HARDWARE ARCHITECTURE

[75] Inventor: Miroslav V. Dokic, Fort Wayne, Ind.

[73] Assignee: Stellar One Corporation

[21] Appl. No.: 08/554,155

[22] Filed: Nov. 6, 1995

[51] Int. Cl.$^6$ ................................................. H04N 7/173
[52] U.S. Cl. ................................ 348/7; 348/423; 455/4.2
[58] Field of Search .................................. 348/423, 7, 10, 348/12, 13, 426; 380/9, 10, 20, 49; 395/550; 370/94.2, 99, 94.1; 455/3.1, 4.1–4.2, 6.1–6.3; H04N 7/173

[56] References Cited

U.S. PATENT DOCUMENTS

| | | | |
|---|---|---|---|
| 4,747,160 | 5/1988 | Bossard | 455/3.1 |
| 5,247,347 | 9/1993 | Litteral et al. | 348/7 |
| 5,400,401 | 3/1995 | Wesilewski et al. | 380/9 |
| 5,410,343 | 4/1995 | Coddington et al. | 348/7 |
| 5,420,866 | 5/1995 | Wasilewski | 380/10 |
| 5,442,390 | 8/1995 | Hooper et al. | 455/4.2 |
| 5,446,490 | 8/1995 | Blahut et al. | 455/4.2 |
| 5,477,263 | 12/1995 | O'Callaghan et al. | 455/4.2 |
| 5,517,250 | 5/1996 | Hoogenboom et al. | 348/467 |
| 5,521,927 | 5/1996 | Kim et al. | 370/94.2 |
| 5,559,999 | 9/1996 | Maturi et al. | 395/550 |
| 5,561,791 | 10/1996 | Mendelson et al. | 395/550 |
| 5,574,505 | 11/1996 | Lyons et al. | 348/426 |
| 5,579,317 | 11/1996 | Pang et al. | 370/94.1 |
| 5,590,202 | 12/1996 | Bestler et al. | 380/49 |
| 5,600,366 | 2/1997 | Schulman | 348/9 |
| 5,619,337 | 4/1997 | Naimpally | 386/83 |
| 5,708,961 | 1/1998 | Hylton et al. | 455/4.2 |
| 5,719,641 | 2/1998 | Mizoguchi | 455/4.2 |

OTHER PUBLICATIONS

Coding of Moving Pictures and Associated Audio: Systems (ISO/IEC JTC1/SC 29/WG11 N0801, Published on Nov. 13, 1994, by the ISO/IEC Copyright Office, Geneva, Switzerland).

*Primary Examiner*—Tommy P. Chin
*Assistant Examiner*—Vu Le
*Attorney, Agent, or Firm*—Christensen O'Connor Johnson & Kindness PLLC

[57] ABSTRACT

An MPEG-2 decoder having a decoupled architecture that allows the rapid acquisition of a program within an MPEG-2 transport stream. A digital signal processor (102) is provided to demultiplex a MPEG-2 transport stream provided on a line (110) into its constituent audio, video, and private data elementary streams. The digital signal processor is capable of performing a limited interpretation of program specific information in the transport stream data, prior to presentation of the program specific information to a host microprocessor (106). In particular, the digital signal processor can demultiplex and interpret back-to-back program association tables and program map tables carried in the transport stream. In the absence of a user selected program, the digital signal processor selects a default program to demultiplex and display to the user. The host microprocessor runs an operating system of the decoder, generates a user interface, and allows the user to select from the programs within the transport stream. Hardware framing logic (114) is also provided to generate and provide to the digital signal processor synchronizing bytes that correspond to the start of each transport packet within the transport stream.

17 Claims, 8 Drawing Sheets

MPEG-2 TRANSPORT STREAM DECODER HAVING DECOUPLED HARDWARE ARCHITECTURE

FIELD OF THE INVENTION

The invention relates to decoders for a digital data stream and, more particularly, to a decoder having a decoupled hardware architecture for demultiplexing and decoding a digital data stream.

BACKGROUND OF THE INVENTION

The transfer of moving pictures and associated audio in digital form typically requires compressing the audio/video data at a source, transmitting the compressed data to a receiver, and decompressing the data for playback. To this end, the ISO Moving Pictures Experts Group (MPEG) has adopted international standards for the generic coding of moving pictures and audio associated with those pictures. The international standard is set forth in draft form in a document entitled *Coding of Moving Pictures and Associated Audio* (ISO/IEC JTC1/SC29/WG11 N0801, published on Nov. 13, 1994, by the ISO/IEC Copyright Office, Geneva, Switzerland), which is hereby incorporated by reference. A first draft of the audio/video coding standard was referred to as MPEG-1, while a second draft of the standard is referred to as MPEG-2.

The MPEG-2 standard sets forth the syntax for an MPEG-2 transport stream that contains audio, video, and private data from several programs with different time bases, all of which are multiplexed together. On the encoding end, the data must be encoded by an MPEG-2 encoder into a transport stream. An MPEG-2 decoder must demultiplex and decode the MPEG-2 transport stream upon receipt at its destination.

Although audio and video decoders are available for decoding MPEG-2 compressed audio and video data, the MPEG-2 audio and video decoders have to date been perceived as too expensive to assemble and disseminate on a widespread basis, such as in homes. Instead, many content providers have adopted delivery systems wherein MPEG-1 audio and video data is carried in an MPEG-2 transport stream. MPEG-1 audio and video decoders are less expensive and commonly available. By minimizing the costs, companies hope to be able to provide video-on-demand or similar applications to the consumer market in a cost effective manner.

Figure 1:
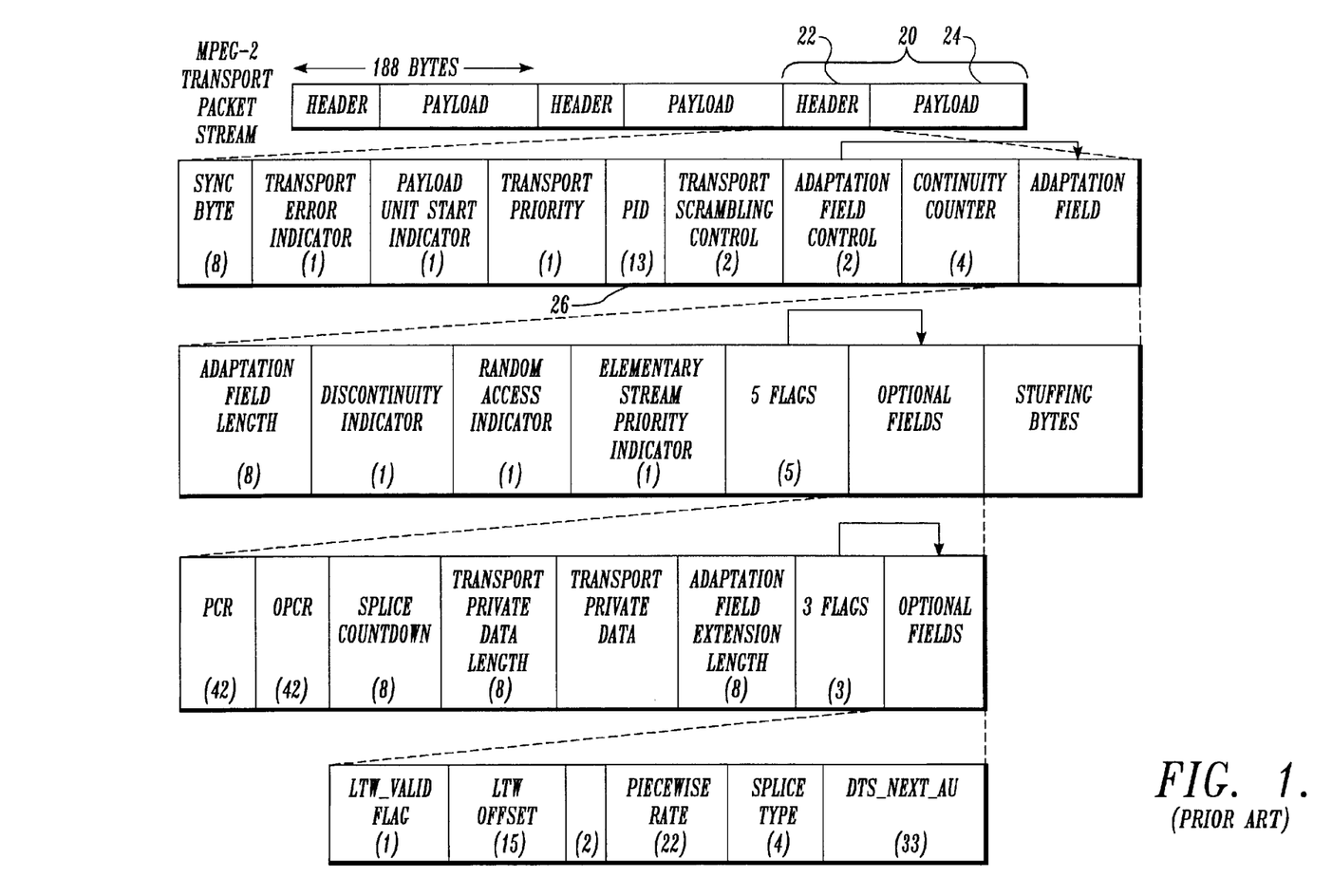
FIG. 1 illustrates the syntax of a transport packet stream as dictated by the MPEG-2 standard.

FIG. 1 illustrates the syntax of an MPEG-2 transport stream. The stream is divided into a number of 188-byte transport packets 20, with each transport packet including a header 22 and a payload 24. The header 22 begins with a 4-byte prefix, a portion of which is a packet identifier (PID) 26 specifying the contents of the payload. The header also includes other required and optional fields that assist in the synchronization and decoding of audio/video data at playback. The payload 24 comprises the data bytes that follow the header bytes in a transport packet. An MPEG-2 transport stream typically carries multiple programs which each have one or more elementary streams, e.g., an audio stream or a video stream. Because multiple programs can be multiplexed in a given MPEG-2 transport stream, different PID values are provided to distinguish between the audio, video, and private data streams provided for each program. Payloads from transport packets having the same PID contain an elementary stream corresponding to one of the programs in the transport stream. For example, a given PID may indicate transport packets from a video data stream of one program carried within the transport stream. A second PID may specify the audio stream of the same program.

Accurately demultiplexing and decoding an MPEG-2 transport stream has proven to be problematic for the industry. In particular, one of the shortcomings in many presently available MPEG-2 decoders is the inability to quickly acquire a program contained within the MPEG-2 transport stream. In order to acquire a given program within the transport stream, an MPEG-2 decoder must first interpret program specific information (PSI) that is contained within the stream. The PSI includes both normative data and private data that enables the programs to be demultiplexed. The MPEG-2 standard requires the PSI data to be divided into four table structures in the transport stream: (1) a program association table (PAT); (2) a program map table (PMT); (3) a network information table; and (4) a conditional access table. For purposes of the present application, the program association table and the program map table are the two PSI tables of interest.

The program association table is identified in the MPEG transport stream by a PID of 0×0000. The program association table contains a list of the programs contained within the MPEG-2 transport stream, and a PID that corresponds to a program map table for each program. When acquiring a new program from an MPEG-2 transport stream, an MPEG-2 decoder must first acquire the program association table to identify the PID corresponding to the desired program's program map table.

After identifying a PID for a desired program, an MPEG-2 decoder must acquire and interpret the program map table that corresponds to the program. The program map table specifies the PIDs for each of the elementary streams associated with the program. Each program in a transport stream typically includes a video elementary stream, one or more audio elementary streams, and one or more private elementary streams. For example, the first audio stream may be an English audio track for the video, and the second audio stream may be a Spanish track for the video. Each of the elementary streams of a given program is assigned a specific PID within the program map table. Once the PID of the elementary streams is determined, the MPEG-2 decoder may demultiplex and decode the transport packets within the MPEG-2 transport stream that correspond to the desired program.

The period it takes to acquire the program association table and the program map table in large part dictates the length of time before a selected program may be displayed to a viewer. At least two situations exist where it would be advantageous to minimize the acquisition time of a desired program from an MPEG-2 transport stream. First, it is important to minimize the acquisition time should errors in the transport stream cause the decoder to lose the transport stream signal. When recovering from an error received in the transport stream, it is desirable to quickly return to the program to minimize the disruption seen by the viewer. Second, it will be appreciated that the advent of remote controls has increased the practice of "channel surfing," i.e., the rapid switching between various channels in order to view a number of programs at a single sitting. The present analog technology used to transmit audio and video information has minimized the amount of time required to switch channels, making a channel change nearly instantaneous from a viewer's perspective. Viewers have therefore become accustomed to the ability to rapidly switch between a number of different programs.

The ability to quickly acquire a selected program has not been successfully duplicated in digital audio and video transmission systems. In large part, the failure to implement this feature has been a result of the processing performed in current MPEG-2 decoders. While there is no requirement in the MPEG standard as to how often the PSI tables are inserted into the transport stream, in a practical MPEG transport stream the tables will have to be inserted at least once a second. The conventional approach adopted by content providers is to insert the PSI tables 15 to 25 times a second, depending upon the available bandwidth of the transmission channel. Content providers have also adopted a convention of following the sending of a program association table with a program map table. The rationale is that by immediately following the program association table with the program map table, the MPEG-2 decoder will be able to rapidly acquire a desired program in the least amount of time.

Figure 2:
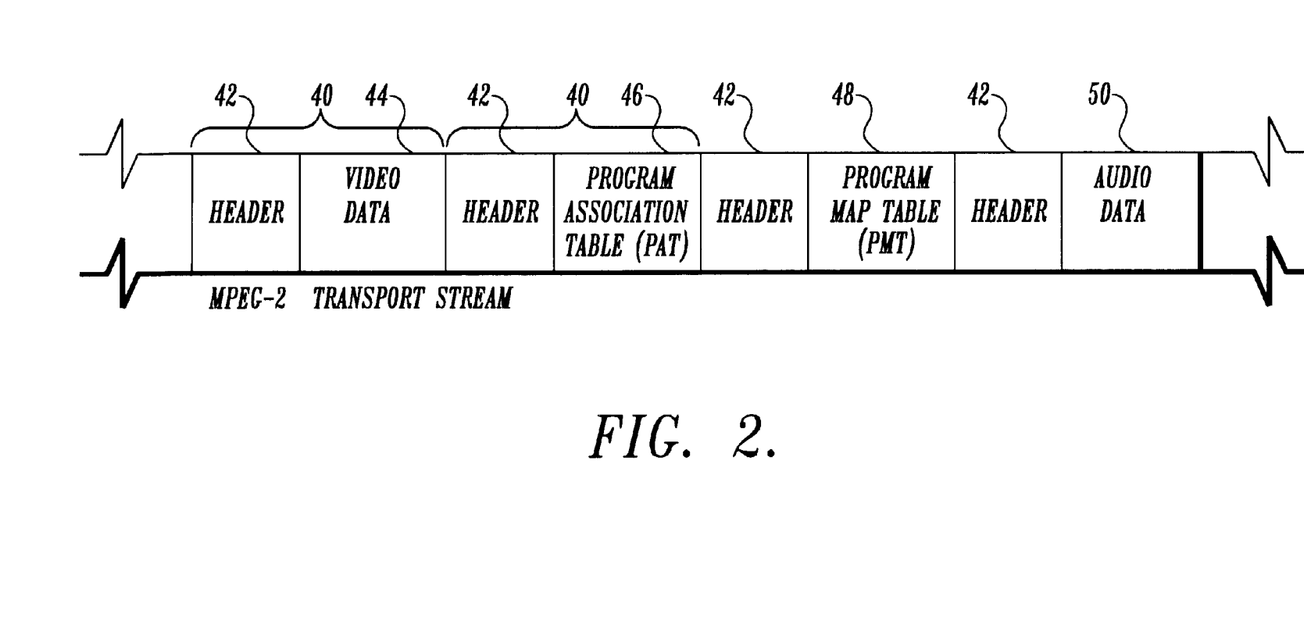
FIG. 2 illustrates a typical MPEG-2 transport packet stream that includes program specific information (PSI), wherein a program association table and a program map table are presented back-to-back.

The back-to-back presentation of PSI tables in an MPEG-2 transport stream is depicted in FIG. 2. Each transport packet 40 in the transport stream contains a header 42 identifying the data contained in the payload. In a typical transport stream, the PSI data carried in transport packets will be interspersed with transport packets carrying video data, audio data, and private data. In the depicted transport stream a payload of video data 44 is received, followed by a program association table 46, a program map table 48, and audio data 50. For purposes of this application, it will be assumed that the entire program association table and program map table may be contained in one transport packet. A single transport packet may contain a program association table defining approximately 30 programs, and a single transport packet may contain a program map table defining 20 different elementary streams for each program. In most anticipated video-on-demand applications, it is not necessary to produce a transport stream exceeding these figures.

It is believed that current systems for the demultiplexing and decoding of an MPEG-2 transport stream have failed to provide rapid program acquisition because they are unable to process back-to-back program association tables and program map tables. Prior art MPEG-2 decoders use a slave demultiplexer that is controlled by a microprocessor to correctly demultiplex the received data. In such prior art systems, upon receipt of a new MPEG-2 transport stream, the microprocessor initially instructs the demultiplexer to parse the program association table from the MPEG-2 stream. Once the microprocessor receives the program association table from the demultiplexer, the microprocessor directs the demultiplexer to load the desired program map table corresponding to a program listed in the program association table. The demultiplexer must then parse the program map table from the incoming MPEG-2 transport stream. After the program map table is provided to the microprocessor, the slave demultiplexer is instructed which video, audio, and private data transport packet PIDs are to be demultiplexed from the transport stream. Only then may the appropriate audio and video data selected by a viewer be provided to the audio and video decoders for decoding.

Because of the delays associated with transferring the program association table and program map table to the microprocessor, and the delays associated with the microprocessor selecting and transmitting to the demultiplexer the desired program to decode, current MPEG-2 decoders are unable to process back-to-back program association tables and program map tables. Therefore at least two, and perhaps more, program map tables must be received following the program association table before the program map table is provided to the microprocessor. While this delay may take only a fraction of a second, to the viewer who has become accustomed to the nearly instantaneous changing of channels, the delay is noticeable and can become annoying. In those situations where the PSI tables are inserted infrequently, it will be appreciated that the delay in acquiring new programs is substantially increased.

An improved MPEG-2 decoder that would minimize the acquisition time of a given program by quickly decoding a program association table and a program map table in an MPEG-2 transport stream would therefore be extremely advantageous.

SUMMARY OF THE INVENTION

A hardware architecture is disclosed for an MPEG-2 decoder that can quickly acquire a program within an MPEG-2 transport stream by decoding back-to-back program association tables and program map tables. The disclosed MPEG-2 decoder relies upon a decoupled processor architecture. A digital signal processor is provided to demultiplex an incoming MPEG-2 transport stream into its constituent audio, video, and private data elementary streams. The digital signal processor is capable of performing a limited interpretation of the transport stream data, prior to presentation of the program specific information (PSI) to a host microprocessor. In particular, the digital signal processor can parse and interpret a program association table and a program map table from the MPEG-2 transport stream, even if received in the MPEG-2 transport stream in a back-to-back configuration. Prior to receiving commands from the host microprocessor, the digital signal processor can begin to demultiplex a default program contained within the MPEG-2 transport stream. In an environment where only a single program is carried within the transport stream, the disclosed construction is therefore advantageous in that it automatically acquires the program prior to instruction from the host microprocessor.

The host microprocessor within the MPEG-2 decoder runs the operating system of the decoder, generates a user interface, and allows the user to select from a number of different programs within the transport stream. The host processor generates overlays on a screen shown to the viewer, allowing the viewer to select programs based on information contained within the transport stream. The microprocessor also allows the user to select among multiple programs within a given MPEG-2 transport stream by interpreting and decoding the program association tables contained within that stream.

In accordance with one aspect of the invention, the decoupled construction disclosed herein allows the rapid acquisition of a desired program within an MPEG-2 transport stream. The limited interpretation capabilities of the digital signal processor allow the digital signal processor to analyze back-to-back program association tables and program map tables. Because the analysis performed by the digital signal processor occurs in a period less than it takes to receive a transport packet, the selected program acquisition may begin with the transport packet immediately following the program map table. The time between selection of a program and display of the program to a viewer is therefore minimized.

In accordance with another aspect of the invention, hardware framing logic is provided to generate synchronizing (sync) bytes for the digital signal processor. The hardware framing logic detects sync bytes that are contained in the header of each MPEG-2 transport stream packet. Upon detection of the sync bytes at appropriate intervals, the hardware framing logic provides a signal to the digital signal processor that indicates synchronization and a signal indicating the start of each MPEG-2 transport packet. The hardware framing logic allows the digital signal processor to start processing the transport stream after the receipt of only two MPEG-2 transport packets. The use of framing logic therefore hastens the acquisition of a given program within the transport stream.

In accordance with still another aspect of the invention, a software routine is disclosed for governing the operation of the digital signal processor. The software routine directs the demultiplexing and limited interpretation of the MPEG-2 transport packets, selecting a default program for initial decoding and display to a viewer. The software routine also handles communication with the host microprocessor, in order to provide the host microprocessor with PSI and private data, as well as to receive instructions from the host microprocessor concerning which transport packets to decode once a user selects a program.

It will be appreciated that the decoupled hardware architecture for the MPEG-2 decoder disclosed herein offers several advantages over prior designs. In particular, the architecture disclosed herein minimizes the acquisition and display time of a program contained within an MPEG-2 transport stream. Any disruption in the audio or video due to changing between programs within a transport stream or due to a temporary loss of a given program by errors within the transport stream is thereby reduced. Additionally, the disclosed decoupled architecture is inexpensive to implement, allowing an MPEG-2 decoder to be constructed that is suitable for video-on-demand applications.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 3:
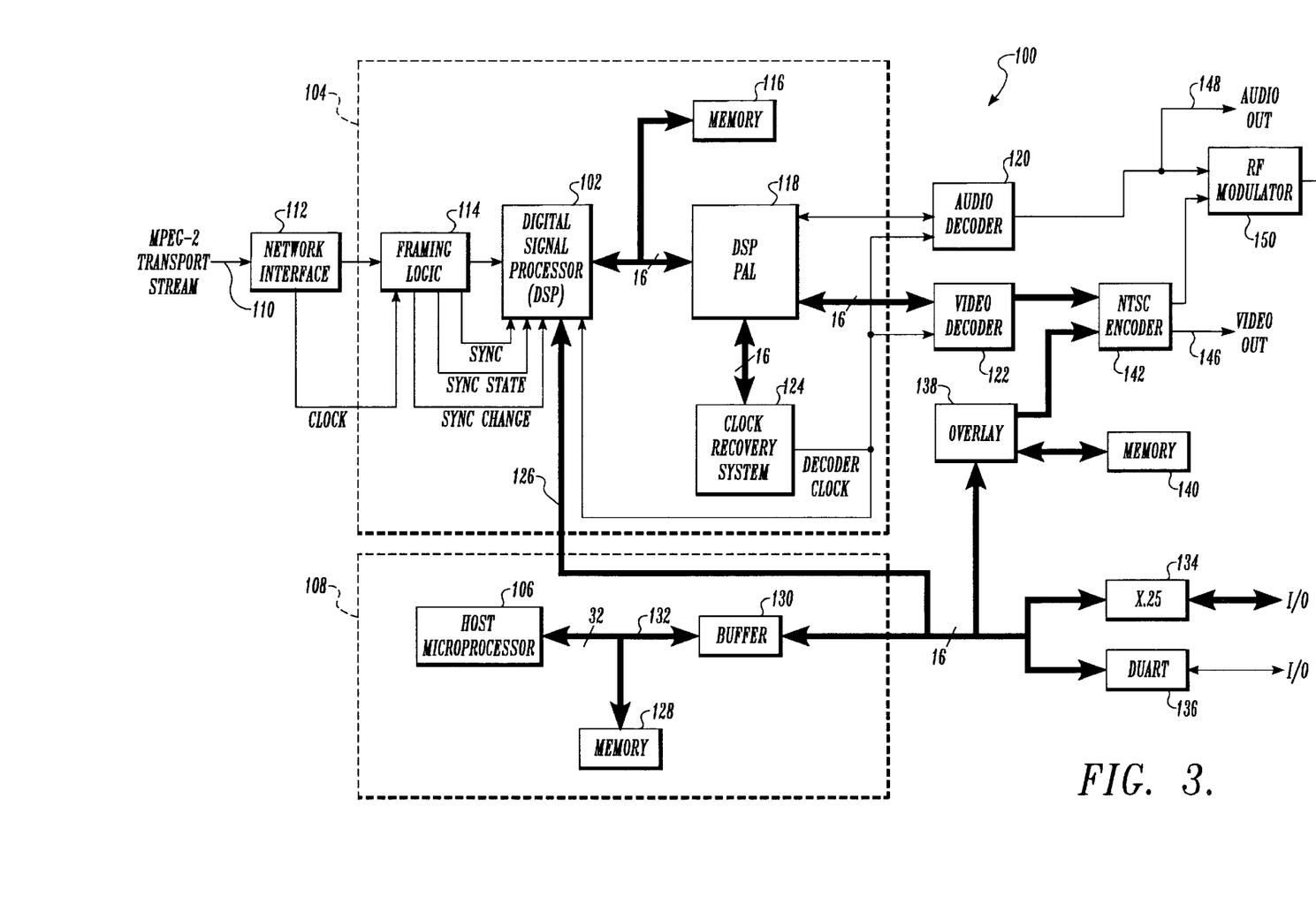
FIG. 3 is a block diagram of an MPEG-2 decoder having a decoupled hardware architecture for demultiplexing and interpreting an MPEG-2 transport stream according to the present invention.

FIG. 3 is a block diagram of an MPEG-2 decoder 100 having a decoupled architecture with two processors. A digital signal processor 102 is provided within a demultiplexer section 104 for demultiplexing an MPEG-2 transport stream into its constituent audio, video, and private data elementary streams. The digital signal processor also has a limited capability to independently interpret the data. A host microprocessor 106 is provided within a control section 108 for directing the demultiplexing of the MPEG-2 transport stream and for running an operating system to interface with a user. As will be described in further detail below, the decoupled architecture of MPEG decoder 100 speeds the decoding of the MPEG-2 transport stream, allowing back-to-back program association tables (PATs) and program map tables (PMTs) to be demultiplexed and interpreted.

In a preferred operating environment of the invention, the MPEG-2 transport stream is provided to the decoder on a T1 line 110 to a network interface chip set 112. Although initially developed to support 24 voice channels, a T1 line will also support a bit transfer rate of 1.544 megabits per second (Mbps) over a single channel. Of the 1.544 Mbps available, 8000 bps are used as frame bits, leaving 1.536 Mbps available for MPEG data. When used in this context, the T1 line is capable of carrying an MPEG-2 transport stream with a single program of MPEG-1 video and multiple MPEG-1 audio tracks. While the invention is disclosed herein with respect to a single program in the transport stream, it will be appreciated that the disclosed architecture also may be used to demultiplex and interpret a number of programs carried in a single transport stream. If multiple programs are carried in the transport stream, an interface chip set supporting a higher transfer rate must be provided in the decoder. For example, an RS-442 interface may be used to support a data rate of 10 Mbps. Other interfaces supporting even higher data rates may, of course, also be incorporated in the decoder.

The network interface chip set 112 receives the MPEG-2 transport stream on T1 line 110 and converts it from a bipolar signal to a unipolar signal for application to framing logic 114. The interface chip set removes the T1 transport stream frame bits, and provides the MPEG-2 transport stream to the framing logic. The network interface chip set also generates a clock that is used by the framing logic to clock each of the bits in the MPEG-2 transport stream. In an exemplary embodiment of the invention, the clock generated by the network interface is a 1.536 MHz clock that corresponds to a clock rate for a single program within the MPEG-2 transport stream on the T1 line.

Framing logic 114 receives the serial MPEG-2 transport stream from the network interface 112, and searches the stream for the sync byte present at the start of each MPEG-2 transport packet header. In the MPEG-2 standard, the sync bytes are uniquely identified by the binary value 0×47 transmitted every 188 bytes in the MPEG-2 transport stream. Framing logic 114 generates and provides to the digital signal processor three control signals to aid in the processing of the MPEG-2 transport packets. In a preferred embodiment, framing logic is a programmable array logic (PAL) device.

Figure 4:
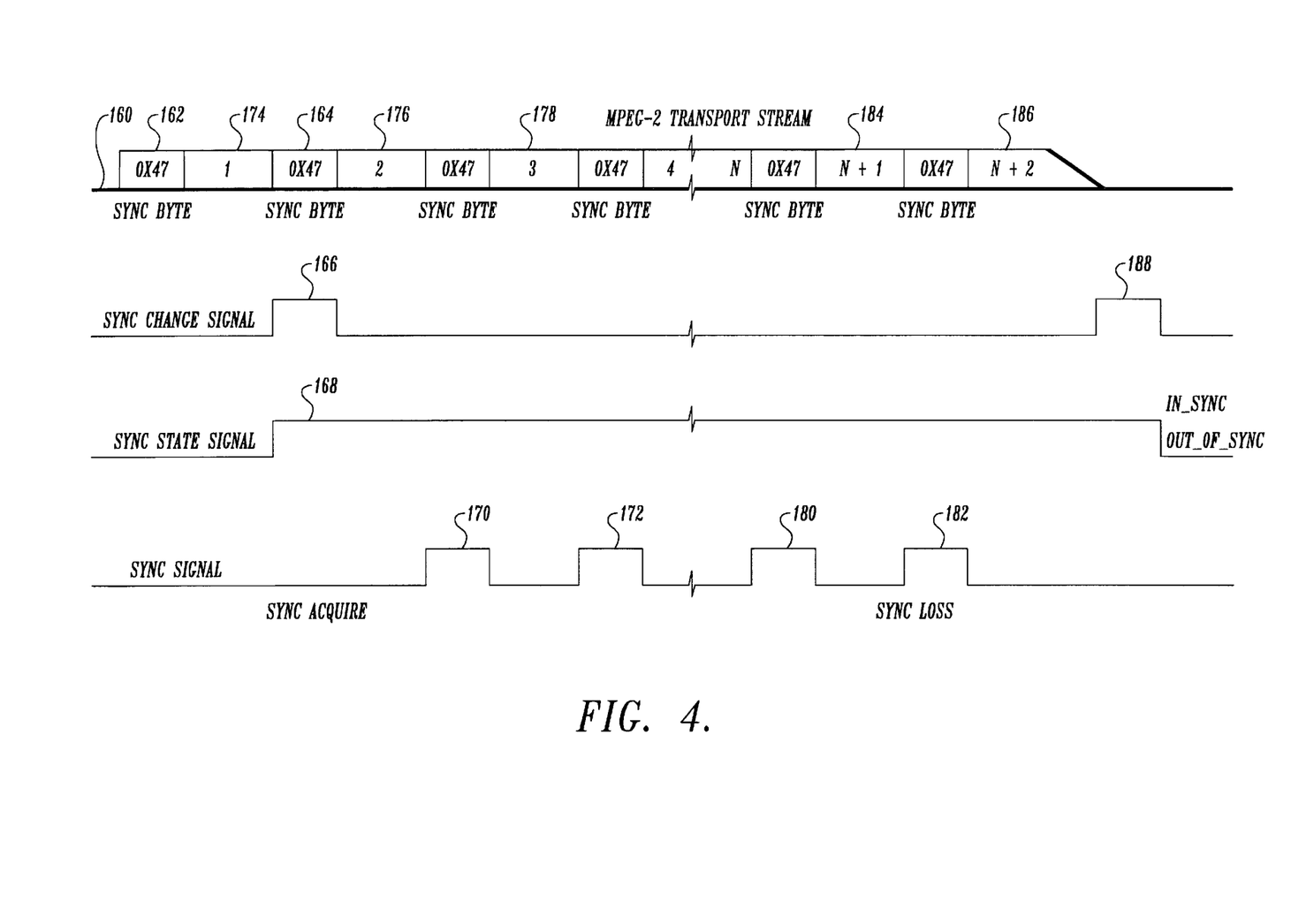
FIG. 4 is a timing diagram of control signals produced by hardware framing logic within the MPEG-2 decoder.

FIG. 4 is a timing diagram of the three control signals produced by framing logic 114. From a line idle state 160, the framing logic initially searches for a first sync byte 162. Once a first sync byte is received, the search continues for a second sync byte 164 that follows 188 bytes later. If a second sync byte is detected, two control signals are provided to the digital signal processor to indicate that an in-sync state has been achieved. A sync change signal 166 is provided to the digital signal processor on an interrupt line of the digital signal processor to indicate a change in the sync state. At the same time, a sync state signal 168 is pulled high to indicate the system is in sync. As long as the framing logic 114 continues to detect sync bytes that are 188 bytes apart, the in-sync state signal 168 is maintained in the logic high state.

The third control signal that the framing logic generates is a sync signal having a number of sync pulses 170, 172, 180, 182 that correspond to the start of each transport stream packet. The sync signal is provided to the digital signal processor as an interrupt on one of the processor interrupt lines. As will be appreciated in the discussion that follows, the sync signal corresponding to a transport packet indicates that the previous transport packet has been loaded into a transport packet buffer in the digital signal processor. Once the transport packet is loaded, the digital signal processor can begin interpreting the data in the packet. As shown in FIG. 4, the sync signal 170 indicates that the second transport packet 176 has been loaded into the digital signal processor. Due to a delay in the digital signal processor enabling for receipt of the packet, however, the second packet may be incomplete. The receipt of sync signal 172 indicates to the digital signal processor that the third transport packet 178 (and the first complete transport packet) can be demultiplexed and interpreted. The generation of the control signals therefore allows the MPEG-2 decoder to quickly acquire and begin to demultiplex transport packets contained within a transport packet stream. In an error free transport stream, only the first two transport packets 174, 176 are lost before demultiplexing begins.

The framing logic also generates three control signals to indicate when the sync byte in the transport stream is corrupted or missing, indicating either an error in the MPEG-2 transport stream or that the transmission line has returned to an idle state. As shown in FIG. 4, sync pulse 180 and 182 are generated to correspond with the start of packets 184 and 186. If packet 186 is incomplete, either due to corruption of the transport stream or the end of transmission, a sync byte will not be present following the packet. Upon failing to detect a sync byte after packet 186, the framing logic generates a sync change signal 188 to indicate a change in sync state. The sync state signal 168 is also switched from an in-sync state to an out-of-sync state to indicate the loss of synchronization. Finally, a sync signal is not generated to indicate the start of the next transport packet. Upon detecting sync change signal 188, sync state signal 168, and the lack of a sync signal, the digital signal processor ceases to demultiplex and interpret data received after packet 186. In an exemplary embodiment of the invention, packet 186 is processed by the digital signal processor even though it may contain corrupted data. Processing the last packet ensures that any private control data contained within the packet will be interpreted if the line merely returned to an idle state due to an end of transmission.

Returning to FIG. 3, digital signal processor 102 is provided to demultiplex the MPEG-2 transport stream into audio, video, and private data elementary streams, and to perform a limited interpretation of the data during the demultiplexing. In a preferred embodiment the digital signal processor is a DSP2111 manufactured by Analog Devices, Inc. of Norwood, Mass. The digital signal processor processes the transport stream by examining each transport packet as the transport packet is received, and demultiplexing the data stream based upon the content of the transport packet headers contained in the stream.

Figure 5:
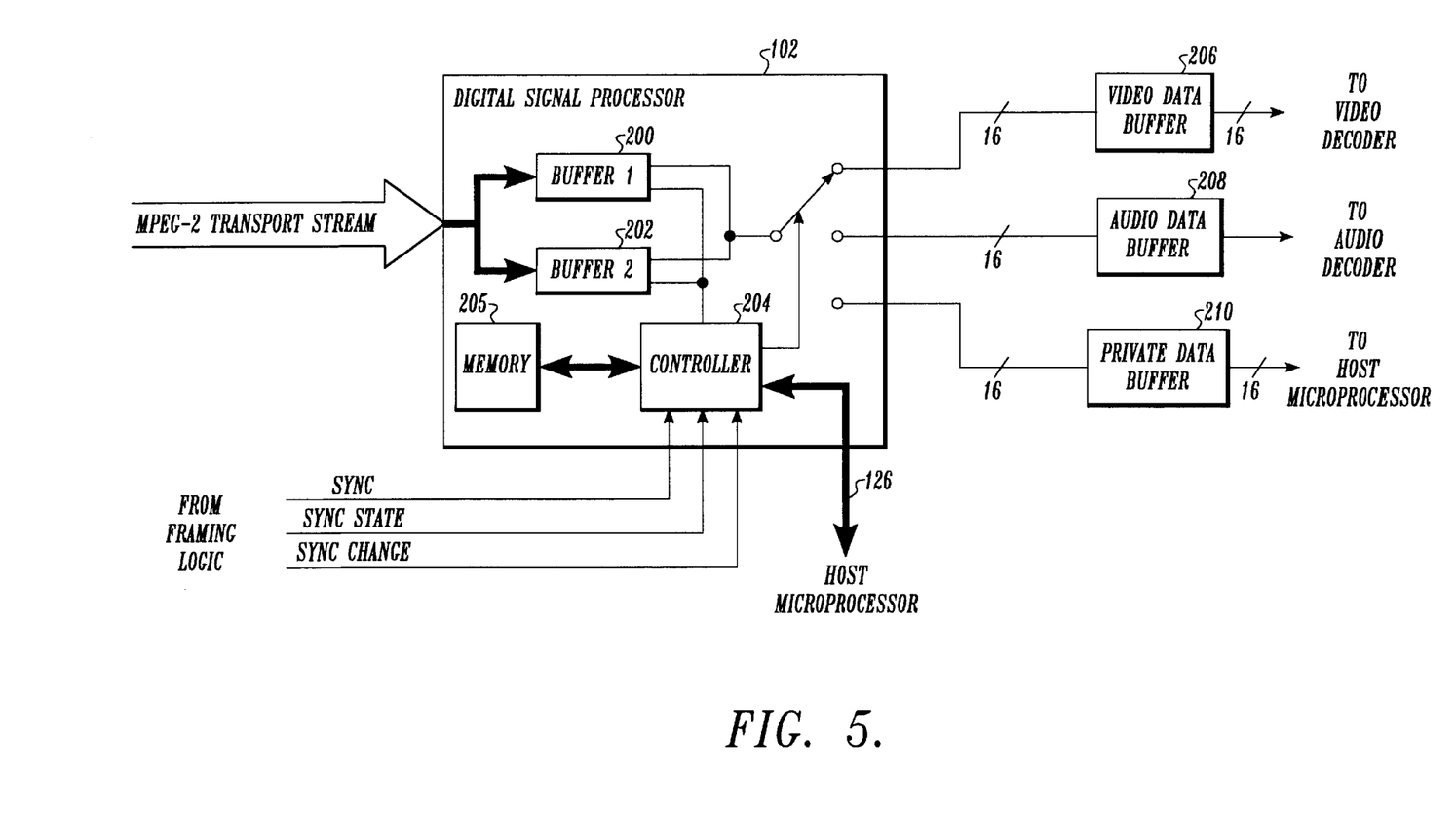
FIG. 5 is a block diagram of the data flow within a digital signal processor contained in the MPEG-2 decoder of the present invention.
Figure 6A:
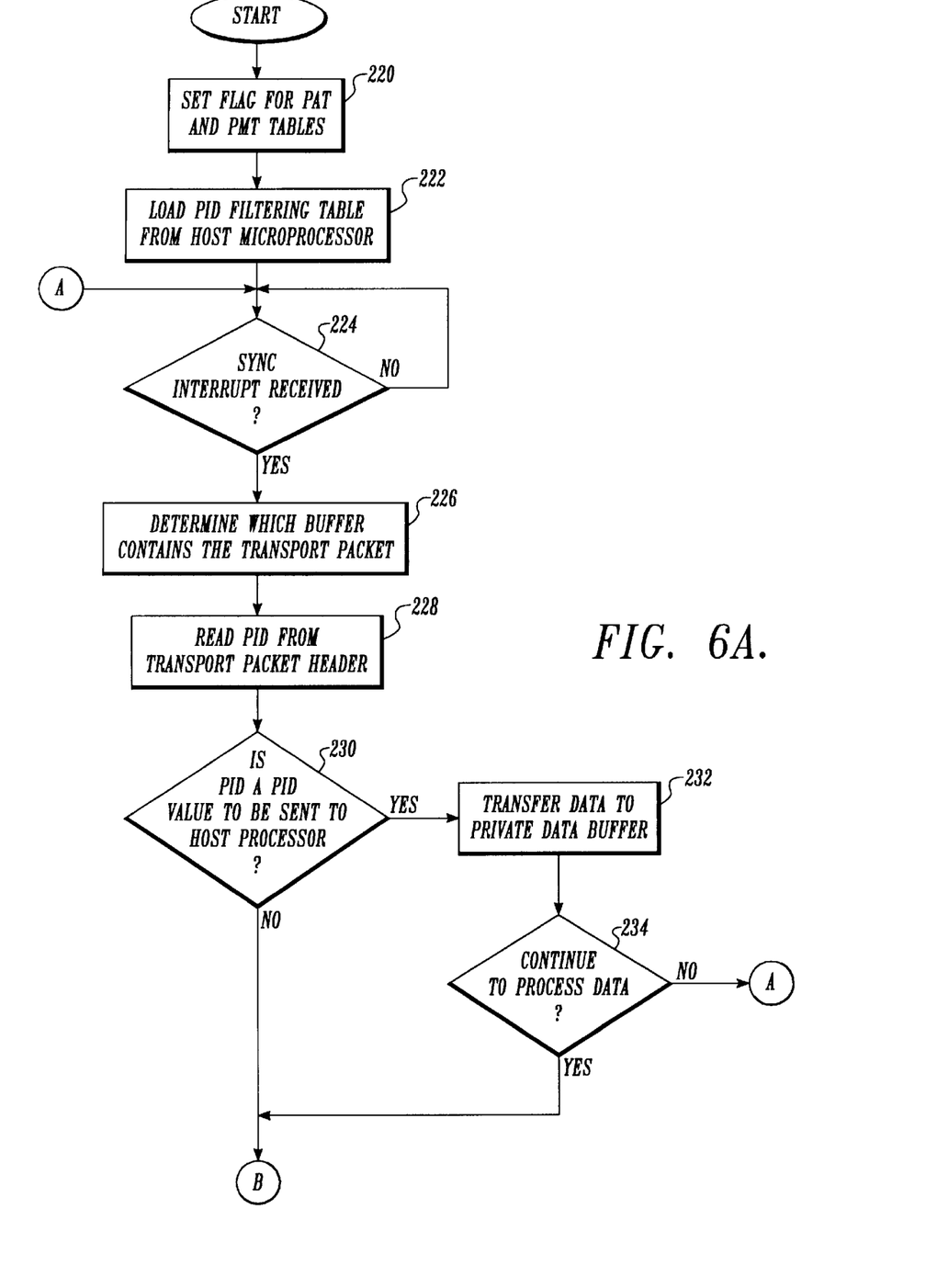
FIGS. 6A–6C are flow charts of an exemplary routine operating within the digital signal processor for demultiplexing and limited interpretation of program specific information contained within an MPEG-2 transport stream.
Figure 6B:
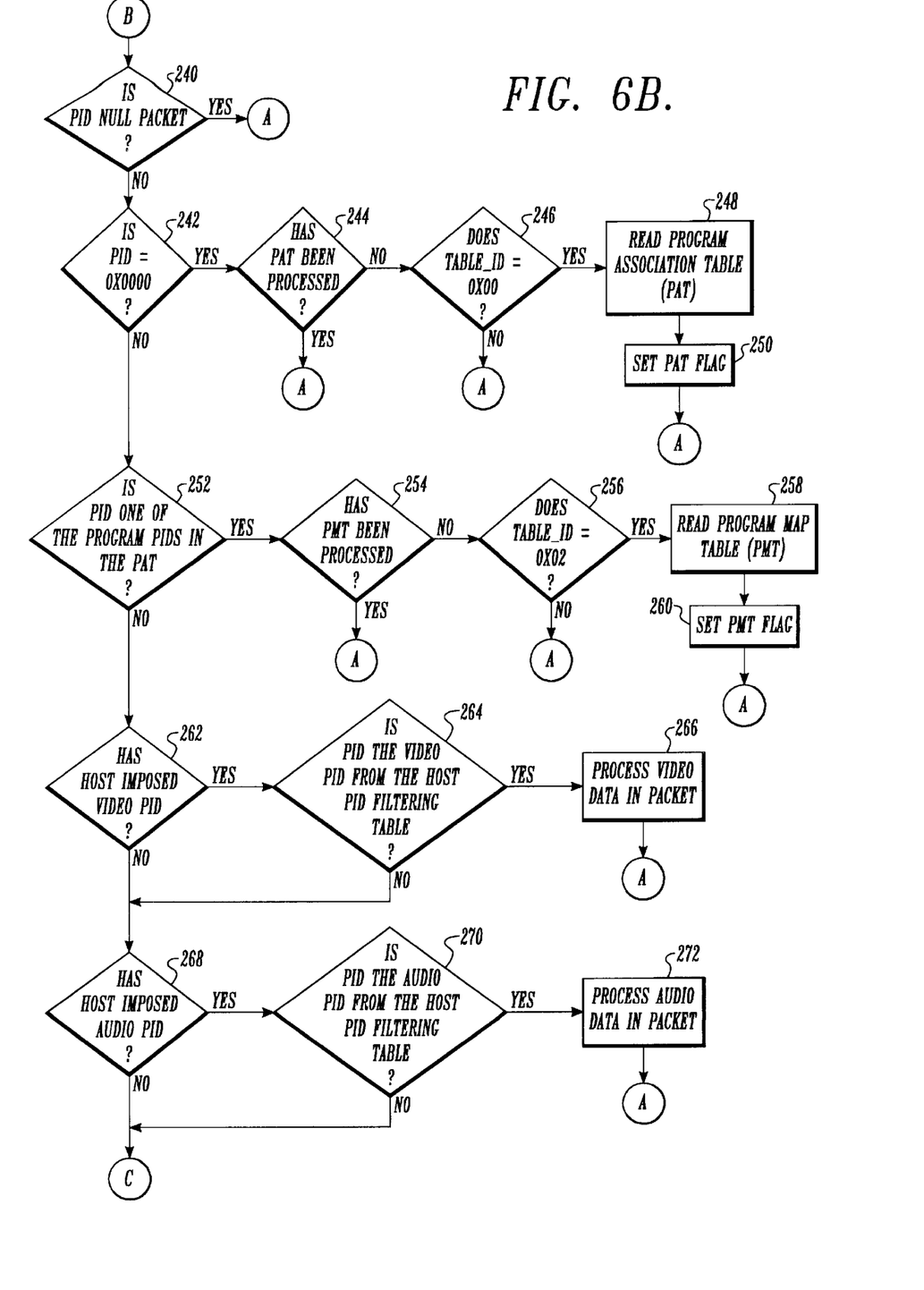
Figure 6C:
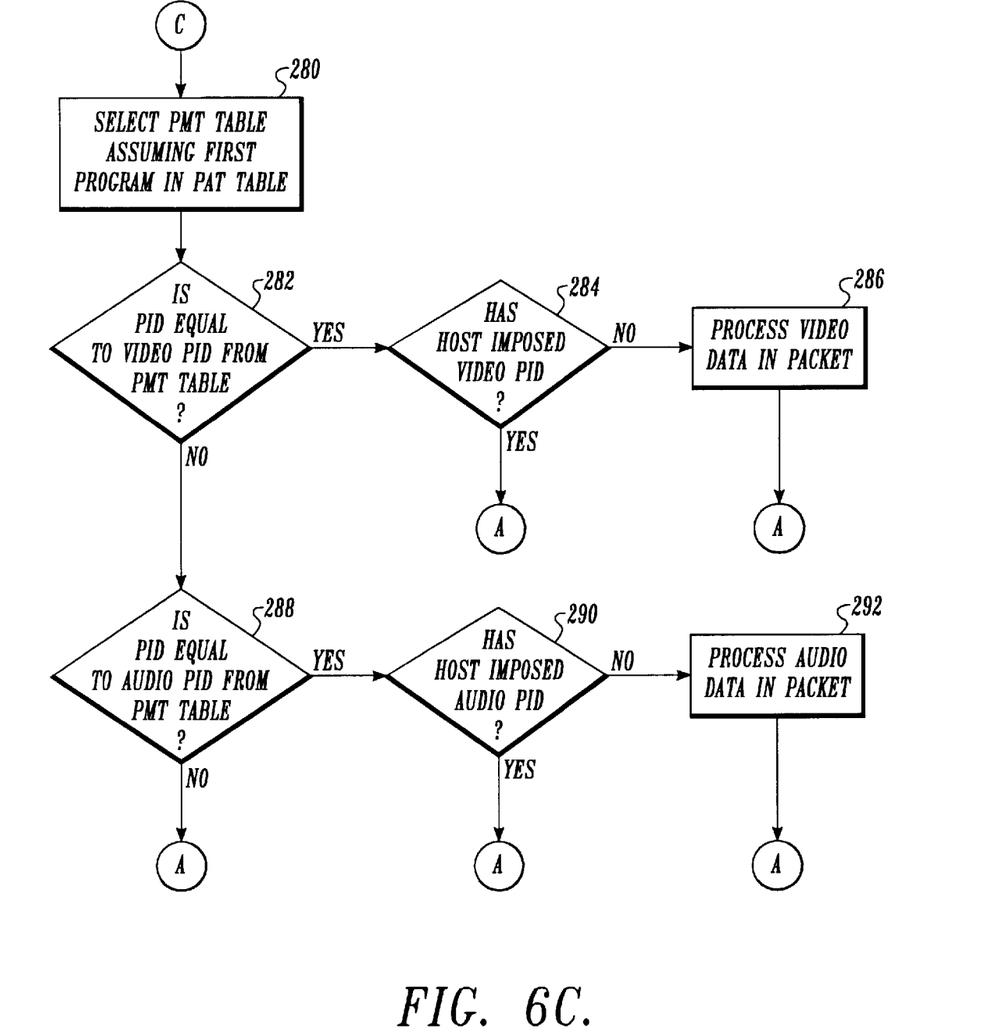

The method of demultiplexing a transport stream into its constituent audio, video, and private data elementary streams may be better understood with reference to FIG. 5 and the flow charts of FIGS. 6A–6C. FIG. 5 is a block diagram depicting the data flow within the digital signal processor during interpretation and demultiplexing of received MPEG-2 transport packets. Digital signal processor 102 contains two transport packet buffers 200 and 202 that are used to load transport packets from the MPEG-2 transport stream. Preferably, each buffer is 188 bytes long so that the buffer may contain an entire MPEG-2 transport packet. The buffers are loaded in a circular fashion, such that when one buffer is loading, the other buffer is being processed by a controller 204 within the digital signal processor.

As shown in FIG. 5, controller 204 relies on the sync control signals produced by the hardware framing logic to identify when a transport packet has been received and stored in a transport packet buffer. When the digital signal processor receives an in-sync state signal, it enables a serial port on the processor to load transport packets from the transport stream. The receipt of the sync signal indicates to the digital signal processor that a transport packet has been loaded into one of the transport packet buffers. During the period it takes to load one of the buffers, the data within the transport packet contained within the other buffer is parsed, interpreted, and transferred to an appropriate buffer external to the digital signal processor.

Controller 204 parses the header from the transport packet within the buffer to determine the ultimate destination of the data within the buffer. Information to aid in demultiplexing the transport stream is determined from one of two sources. First, the digital signal processor may use a PID filtering table to determine the contents of each transport packet and transfer the contents to an appropriate destination. The PID filtering table is loaded from the host microprocessor over a bus 126 and stored in a memory 205. The PID filtering table is a table of PID values generated by the host microprocessor that correspond to a user selected program to be decoded from the transport stream. Preferably, the PID filtering table contains 16 entries. The first two entries within the table identify the PIDs of the transport packets carrying video and audio data, respectively. The payloads in the video and audio transport packets are to be demultiplexed from the program stream and provided to a video buffer 206 or an audio buffer 208. The third entry provides the PID of the transport packets that contain program clock reference values. The program clock reference values are used by a clock recovery system to recover an encoder clock for system operation. The clock recovery system is discussed in greater detail in a concurrently filed U.S. patent application, entitled "Method and System for the Recovery of an Encoder Clock from an MPEG-2 Transport Stream," commonly assigned to the assignee of the present application, and expressly incorporated herein by reference (hereinafter the "Clock Recovery application"), now issued as U.S. Pat. No. 5,699,392. The remaining entries within the PID filtering table contain PID values of transport packets that are to be parsed from the MPEG-2 transport stream and provided to a private data buffer 210. Those transport packets having PIDs that do not match the entries in the PID filtering table are discarded.

The second source for information on demultiplexing the transport stream is from the program specific information carried in the stream. If a user has not selected a program to view, or a PID filtering table is unavailable from the host microprocessor, the digital signal processor may select a default program for display to a user. A program association table and a program map table are each recovered from the MPEG-2 transport stream and stored in memory 205. A default program is then selected from the program association table by the digital signal processor. The entries in the corresponding program map table are used by the digital signal processor to demultiplex the transport stream. Again, when the type of data within the transport packet is determined, the data is transferred to video buffer 206, audio buffer 208, private data buffer 210, or it is discarded.

In addition to demultiplexing and transferring the transport packets to the appropriate data buffer within the MPEG-2 decoder, the digital signal processor also performs a limited interpretation of the data. The data interpretation may be better understood with respect to the flow charts of FIGS. 6A–6C.

FIGS. 6A–6C are flow charts of an exemplary routine that is performed by the digital signal processor to demultiplex the audio, video, and private data from a transport stream. Prior to demultiplexing the program from the stream, the routine must first read the program specific information contained within the transport stream in order to identify the PID values that correspond with the program to be displayed. Upon decoder initialization, flags are therefore set at a block 220 indicating that the program association table and the program map tables have not been read from the current MPEG-2 transport stream.

At a block 222, the routine loads a PID filtering table from the host microprocessor. At block 222, if no PID filtering table is available from the host microprocessor because the decoder has yet to identify the desired program to be viewed, the PID filtering table is cleared, allowing the routine to select and display to the user a default program.

At a decision block 224, the digital signal processor waits to receive the sync signal indicating that the transport packet buffer within the digital signal processor has been loaded with a new transport packet. Upon receiving a sync signal, at a block 226 the routine determines which transport packet buffer contains the newly loaded transfer packet. At a block 228, the PID value is parsed from the transport packet header in order to identify the type of data carried by the transport packet.

At a decision block 230, a test is made to see if the PID from the received transport packet is one of the PIDs that should be sent to the host processor. That is, at decision block 230 the PID filtering table is checked to see if the PID matches any of the entries within the table that correspond to data to be sent to the host processor. If the data is to be sent to the host processor, the digital signal processor transfers the either the entire packet or the payload data from the transport packet into the private data buffer at a block 232. At a block 234, a test is made to determine whether the private data should also be processed by the digital signal processor. It will be appreciated that it may also be desirable to have the host microprocessor receive data that is normally directly transferred to the audio or video data buffers. If the digital signal processor is merely to transfer the data to the host processor, the routine returns to a decision block 224 where it waits to receive the next transport packet. If the digital signal processor is to continue to process the data, after decision block 234 the routine continues to a decision block 240.

At decision block 240 (FIG. 6B), a test is made to see if the PID from the received transport packet indicates that the transport packet is a null packet. It will be appreciated that in an MPEG-2 transport stream, null packets may be inserted into the stream if no data is being sent by the encoder. If the PID packet is a null packet, the routine returns to decision block 224 where it waits to receive the next transport packet.

If the transport packet is not a null packet, at a decision block 242 a test is made to see if the PID indicates that the transport packet contains a program association table. That is, a test is made to see if the PID equals the value 0×0000. At a decision block 244, a test is made to determine if the program association table has already been recovered for the current transport stream. If the program association table remains constant, it is not necessary to continually update the program association table that is stored within the digital signal processor. If the program association table has already been processed, the routine returns to decision block 224 where it waits to receive the next transport packet.

At a decision block 246, a test is made to determine if a table_ID contained in the PAT equals 0×00, a redundant check that ensures that the information contained in the transport packet corresponds to the program association table. If the table_ID is correct, at a block 248 the program association table is read by the digital signal processor and stored. In a preferred operating environment, the number of programs within the transport stream does not exceed the number of programs that can be listed in a program association table contained in a single transport packet. Recovery of the program association table therefore requires the examination of only a single transport packet. It will be appreciated, however, that the routine may be appropriately modified to allow processing of program association tables that extend beyond a single transport packet by using a section index number contained within the PAT. At a block 250, the program association table flag is set indicating that the table from the current MPEG-2 transport stream has been read and stored from the transport stream. The routine then returns to decision block 224 where it waits to receive the next transport packet.

If the PID did not indicate that the packet is the program association table, at a decision block 252 a test is made to determine if the PID is one of the program PID values listed in the program association table. If the PID value is one of the program PID values in the program association table, the program map table must be recovered from the transport stream. It will be appreciated that at decision block 252, the program association table must have been recovered from the transport stream before the test can be made. The program association table is initialized with values not corresponding to any of the valid PIDs that may be contained within the transport stream. If the program association table has not been recovered prior to reaching decision block 252, the test performed at decision block 252 will not be satisfied.

At a block 254, a test is made to determine if the program map table has been already recovered from the transport stream. If the program map table has not been recovered, at a decision block 256 a test is made to determine if the table_ID of the PMT is 0×02. This redundant check ensures that the contents of the transport packet correspond with the program map table. If the table_ID is correct, at a block 258 the program map table is read from the transport packet and stored in the digital signal processor. In a preferred operating environment, the number of elementary streams within a program does not exceed the number of elementary streams that can be listed in a program map table contained in a single transport packet. Recovery of the program map table therefore requires the examination of only a single transport packet. It will be appreciated, however, that the routine may be appropriately modified to allow processing of program map tables that extend beyond a single transport packet by using a section index number contained within the PMT. At a block 260, the program map table flag is set indicating that the program map table has been recovered from the transport packet stream. After loading the program map table, the routine returns to decision block 224 where it waits to receive the next transport packet.

If the PID in the current transport packet does not correspond to one of the program PIDs in the program association table, at a block 262 a test is made to determine if the host microprocessor has imposed a video PID on the system. In this context, "imposed" implies that the host microprocessor has selected a program and that the selected program should be shown rather than a default program. If the host microprocessor has imposed a video PID, at a decision block 264 a test is made to determine if the PID in the received transport packet corresponds with the video PID entry in the PID filtering table. If the PID in the transport packet indicates that the payload of the packet is video data corresponding to the program selected to be shown by the host microprocessor, at a block 266 the video data contained within the payload is transferred to the video buffer of the MPEG-2 decoder. The transfer of the video data is described in further detail in a concurrently filed U.S. patent application, entitled "Method for Ensuring Synchronization of MPEG-1 Data Carried in an MPEG-2 Transport Stream," commonly assigned to the assignee of the present application, and expressly incorporated herein by reference (hereinafter the "Synchronization application"), now issued as U.S. Pat. No. 5,726,989. The routine then returns to decision block 224 where it waits to receive the next transport packet.

If the host did not impose a video PID, or the PID within the transport packet did not match the video PID from the host filtering table, at a decision block 268 a test is made to determine if the host has imposed an audio PID. In this context, "imposed" again refers to the selection by the host of an audio elementary stream to recover from the transport stream. If the host microprocessor has imposed an audio PID, at a decision block 270 a test is made to determine if the PID in the received transport packet corresponds with the audio PID entry from the host filtering table. If the PID in the transport packet matches the audio PID entry, at a block 272 the audio data is transferred from the digital signal processor buffer into the audio data buffer. The transfer of the audio data is described in further detail in the copending Synchronization application. The routine then returns to decision block 224 where it waits to receive the next transport packet.

If a video and audio program have not been selected by the host microprocessor, the routine proceeds to a block 280. Blocks 280–292 of the routine allow a default program to be presented to a viewer if the host microprocessor has not selected a program. It will be appreciated that in the preferred environment wherein only a single program is provided in the MPEG-2 transport stream, the automatic selection and immediate display of the default program to a user greatly improves the initial display time, or the recovery period following errors in the transport stream. In an environment having additional programs within the MPEG-2 transport stream, blocks 280–292 ensure that prior to receiving any instruction from the host microprocessor, a program will be displayed to the viewer.

At a block 280, the routine automatically selects the first program in the program association table to display to a user. The program map table that corresponds with the first program in the program association table is also selected by the routine for comparison with the received transport packet PID. At a decision block 282, a test is made to determine if the PID in the transport packet equals the video PID from the default program map table. If the PID equals the video PID, at a decision block 284 a test is made to determine if the host has imposed a video PID on the MPEG-2 decoder. If the host has already selected a program for viewing, the decoder should not demultiplex the default program from the transport stream. If the host has imposed a video PID, the routine therefore returns to decision block 224 to receive the next transport packet within the stream. If the host has not imposed a video PID, however, the routine continues to a block 286 where the video data within the received transport packet is transferred to the video data buffer. Absent contrary instructions from the host, the routine will therefore display the elementary video stream corresponding to the first program within the program association table.

At a decision block 288, a test is made to determine if the PID in the transport packet is equal to the audio PID from the default program map table. If the PID value of the received transport packet is equal to the audio PID value from the default table, at a decision block 290 a test is made to determine if the host has imposed the audio PID. Similar to the video case, if the host has selected an elementary audio data stream for presentation to a listener, the routine should not select the default audio track from the first program. If the host has not imposed an audio PID, at a block 292 the audio data is transferred from the transport packet to the audio data buffer. Absent contrary instructions from the host microprocessor, therefore, the MPEG-2 decoder of the present invention selects the audio elementary stream corresponding to the first program in the program association table. After transferring the audio data to the appropriate buffer, the routine returns to decision block 224 to receive the next transport packet.

Several advantages arise from having a digital signal processor that can perform limited processing while demultiplexing the MPEG-2 transport stream. Most importantly, back-to-back program association tables and program map tables may be processed to ensure the rapid acquisition of a program for presentation to a viewer. Additionally, the limited interpretation provided by the digital signal processor allows the processor to select and display a default program to a viewer prior to selection of the program by that viewer. Selecting a default program speeds the presentation of a program to a user, especially in an environment having only a single program within the MPEG-2 transport stream. The disclosed decoupled hardware architecture therefore offers an improved viewing environment because of its rapid program acquisition and recovery from errors in a transport stream.

Returning to FIG. 3, after loading the audio and video data into the appropriate buffers, the audio and video data are delivered to an MPEG-1 audio decoder 120 and an MPEG-1 video decoder 122 at a rate that ensures appropriate presentation of the audio and video information to a user. Using a technique that is beyond the scope of the present application, the audio and video data are first stored in a memory 116 before being transferred to the audio decoder 120 and the video decoder 122. To assist in these transfers, a programmable array logic (PAL) chip 118 is provided to address the memory and the decoders. Further information about the synchronizing of the audio and video MPEG-1 data is provided in the concurrently filed Synchronization application. The private data is provided on a bus 126 to a buffer within control portion 108 of the MPEG-2 decoder.

To ensure accurate reproduction of the audio and video programming carried in the transport stream, a clock recovery system 124 is provided to generate a decoder clock that oscillates at the same frequency as the encoder clock used to encode the transport stream. Further information about the clock recovery system is may be found in the concurrently filed Clock Recovery application.

Control portion 108 of the MPEG-2 decoder is responsible for providing an interface between the decoder and a user, allowing the user to select between different programs within the MPEG-2 transport stream. Control portion 108 contains host microprocessor 106, preferably a 32-bit 68EC020 manufactured by Motorola. The microprocessor is connected with a buffer 130 and a memory 128 by a 32-bit bus 132. To allow the microprocessor to communicate with the digital signal processor 102, the microprocessor's 32-bit bus 132 must be coupled to the 16-bit bus 126 of the digital signal processor. Buffer 130 is therefore provided to connect the microprocessor bus with the digital signal processor bus and allow communication between the two portions of the MPEG-2 decoder.

Host microprocessor 106 runs the operating system used by MPEG decoder 100. An exemplary operating system developed for video-on-demand applications is OS-9, manufactured by Microware of Des Moines, Iowa. The OS-9 operating system acts as an underlying system to manage the decoder functions. Also preferably running on microprocessor 106 is an application program known as DAVID (Digital Audio Video Interactive Decoder) developed by Microware. DAVID is an application program for the video-on-demand environment that generates an interface with a user, allowing the user to select a program from the various digital and audio programs received in a digital transport stream. Upon selection of a program, a new PID filtering table is constructed and provided to the digital signal processor. It will be appreciated that low-level drivers are also provided to appropriately interface DAVID and the operating system with the particular hardware disclosed. The design of such drivers is considered to be within the capabilities of one of ordinary skill in the art from the description of the system given herein.

Additional components are present within the MPEG-2 decoder to interface the decoder with a user and with audio and video display equipment. Connected to bus 126 are interfaces allowing data to be sent and received from the decoder. An X.25 interface 134 allows parallel data transfer between a user and the decoder based on the CCITT X.25 recommendation. A dual universal asynchronous receiver/transmitter (DUART) 136 is also provided to allow serial communication with an external device. Each of the interfaces is connected by bus 126 with the demultiplexer section and the control section of the decoder.

Overlay hardware 138 and associated memory 140 are provided to allow microprocessor 106 to superimpose graphic displays over the picture generated by the MPEG-2 decoder. The overlay hardware 138 is connected to an NTSC encoder which combines the overlay with the decompressed video picture provided by video decoder 122. The NTSC encoder converts the digital picture information into an analog signal that may be directly output on a line 146 for display on a video monitor. Alternatively, the NTSC encoder also provides the video signal to an RF modulator 150 where it is modulated with the analog audio signal produced by audio decoder 120. The RF modulator combines the video and audio signal and provides the signal to a television where it may be displayed. On a line 148, the audio decoder 120 provides the decoded audio signal to a user.

It will be appreciated that the decoupled architecture disclosed in FIG. 3 is advantageous in that it improves demultiplexing and decoding of the MPEG-2 transport stream by separating the decoding responsibilities into two parts. Demultiplexing of the transport stream is performed by the digital signal processor 102, and control responsibilities are performed by the host microprocessor 106. Having a digital signal processor perform the demultiplexing autonomously from the host microprocessor allows the digital signal processor to perform limited interpretation of the transport stream as each transport packet is received. The digital signal processor may therefore identify and interpret back-to-back program association tables and program map tables from the transport stream. The decoupled architecture also allows the decoder to quickly synchronize with the transport stream and begin to decode the information contained within the stream. The decoder may therefore quickly recover following periods in which the transport stream is corrupted, causing a temporary loss of synchronization and display.

While the preferred embodiment of the invention has been illustrated and described, it will be appreciated that various changes can be made therein without departing from the spirit and scope of the invention. For example, the routine disclosed herein is only exemplary in nature, and various changes can be made to the routine to suit the requirements of the user. For example, while preferably the first program from the program association table is selected as a default program to display, other programs from the program association table could be selected for display. Consequently, within the scope of the appended claims it will be appreciated that the invention can be practiced otherwise than as specifically described herein.

The embodiments of the invention in which an exclusive property or privilege is claimed are defined as follows:

1. An MPEG-2 decoder for demultiplexing and interpreting an MPEG-2 transport stream, the MPEG-2 transport stream containing a plurality of programs that are divided into a plurality of transport packets, each of the plurality of transport packets comprising a header and a payload, the payload carrying portions of an audio, video, or private data elementary stream, and the header carrying information about the contents of the payload, the MPEG-2 decoder comprising:

(a) an interface for receiving said MPEG-2 transport stream;
   (b) a decoupled architecture with at least two processors, including at least a host processor and an additional processor, the host processor generating an interface with a user and allowing the user to select a desired program carried within the MPEG-2 transport stream for display to the user and the additional processor being coupled to the host processor and being coupled to the interface for demultiplexing the transport stream into audio, video, and private data elementary streams in accordance with the contents of the transport packet headers, wherein the additional processor is capable of processing back-to-back program association tables and program map tables, and wherein the additional processor recovering program specific information from the transport stream, and prior to presenting the program specific information to the host processor interpreting the program specific information to display to a user a default program from the transport stream absent selection of a desired program by the user.

2. The MPEG-2 decoder of claim 1, wherein the additional processor is a digital signal processor.

3. The MPEG-2 decoder of claim 2, further comprising an audio decoder and a video decoder.

4. The MPEG-2 decoder of claim 3, wherein the audio data is provided to the audio decoder, the video data is provided to the video decoder, and the private data is provided to the host processor.

5. The MPEG-2 decoder of claim 4, wherein the audio decoder is an MPEG-1 audio decoder and the video decoder is an MPEG-1 video decoder.

6. The MPEG-2 decoder of claim 1, wherein the program specific information recovered from the MPEG-2 transport stream is a program association table and a program map table.

7. The MPEG-2 decoder of claim 6, wherein the program association table and the program map table are provided in the MPEG-2 transport stream in consecutive transport packets.

8. The MPEG-2 decoder of claim 1, wherein the MPEG-2 transport stream carries a single program.

9. The MPEG-2 decoder of claim 1, further comprising hardware framing logic coupled between the additional processor and the interface, the hardware framing logic receiving the MPEG-2 transport stream and generating and providing to the processor a synchronizing pulse corresponding to a start of each transport packet in the transport stream.

10. The MPEG-2 decoder of claim 9, wherein the demultiplexing of the transport stream begins with a third consecutive received transport packet.

11. An MPEG-2 demultiplexer for demultiplexing and interpreting an MPEG-2 transport stream, the MPEG-2 transport stream containing a plurality of programs that are divided into a plurality of transport packets, each of the plurality of transport packets comprising a header and a payload, the payload carrying portions of an audio, video, or private data elementary stream, and the header carrying information about the contents of the payload, the MPEG-2 demultiplexer comprising a decoupled architecture with at least two processors, the decoupled architecture comprising:

(a) a first processor for generating an interface with a user and allowing the user to select a desired program carried within the MPEG-2 transport stream for display to the user; and (b) a second processor coupled to the first processor, the second processor, capable of processing back-to-back program association tables and program map tables, receiving the MPEG-2 transport stream and demultiplexing the transport stream into its constituent audio, video, and private data elementary streams in accordance with the contents of the transport packet headers, the second processor recovering program specific information from the transport stream, and prior to presenting the program specific information to the first processor interpreting the program specific information to display to a user a default program from the transport stream absent selection of a desired program by the user.

12. The MPEG-2 demultiplexer of claim 11, wherein the additional processor is a digital signal processor.

13. The MPEG-2 demultiplexer of claim 12, wherein the audio data is provided to an audio decoder, the video data is provided to a video decoder, and the private data is provided to the host processor.

14. The MPEG-2 demultiplexer of claim 11, wherein the program specific information recovered from the MPEG-2 transport stream is a program association table and a program map table.

15. The MPEG-2 demultiplexer of claim 14, wherein the program association table and the program map table are provided in the MPEG-2 transport stream in consecutive transport packets.

16. The MPEG-2 demultiplexer of claim 11, wherein the MPEG-2 transport stream carries a single program.

17. The MPEG-2 demultiplexer of claim 11, wherein the demultiplexing of the transport stream begins with a third consecutive received transport packet.

* * * * *